US012643556B2

(12) United States Patent
Chopade et al.

(10) Patent No.: US 12,643,556 B2
(45) Date of Patent: Jun. 2, 2026

(54) INDIVIDUAL INFORMATION AND RECOMMENDATION SYSTEM FOR VEHICLES

(71) Applicant: FCA US LLC, Auburn Hills, MI (US)

(72) Inventors: Pravin Vishwasrao Chopade, Troy, MI (US); Amit Mehta, Troy, MI (US); Gyanesh Shrivastava, Troy, MI (US); Ashish Bansal, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 60 days.

(21) Appl. No.: 18/680,080

(22) Filed: May 31, 2024

(65) Prior Publication Data

US 2025/0368209 A1    Dec. 4, 2025

(51) Int. Cl.
B60W 50/00 (2006.01)

(52) U.S. Cl.
CPC .... B60W 50/0098 (2013.01); B60W 50/0097 (2013.01); B60W 2050/0083 (2013.01); B60W 2556/10 (2020.02)

(58) Field of Classification Search
CPC ......... B60W 50/0098; B60W 50/0097; B60W 2556/10; B60W 2050/0083
See application file for complete search history.

(56) References Cited

U.S. PATENT DOCUMENTS

| | | | |
|---|---|---|---|
| 9,940,834 B1 | 4/2018 | Konrardy et al. | |
| 9,996,756 B2 | 6/2018 | Hoye et al. | |
| 9,997,077 B2 | 6/2018 | Oshida et al. | |
| 10,023,114 B2 | 7/2018 | Adams et al. | |
| 10,043,372 B1 | 8/2018 | Hollenstain et al. | |
| 10,057,407 B2 | 8/2018 | McSchooler | |
| 10,078,871 B2 | 9/2018 | Sanchez et al. | |
| 10,096,067 B1 | 10/2018 | Slusar | |
| 10,102,546 B2 | 10/2018 | Heath | |
| 10,147,008 B1 | 12/2018 | Chan et al. | |
| 10,150,478 B2 | 12/2018 | Sasabuchi | |
| 10,163,275 B1 | 12/2018 | Brinkmann et al. | |

(Continued)

FOREIGN PATENT DOCUMENTS

| | | |
|---|---|---|
| EP | 2830023 B1 | 5/2018 |
| EP | 3265343 B1 | 2/2020 |

(Continued)

OTHER PUBLICATIONS

International Search Report and Written Opinion dated Jul. 1, 2025 for International Application No. PCT/US2025/026360, International Filing date Apr. 25, 2025.

*Primary Examiner* — Wade Miles
*Assistant Examiner* — Zachary Joseph Wallace
(74) *Attorney, Agent, or Firm* — Jeremy J. Klobucar

(57) ABSTRACT

A method for providing customized information to a user, that includes receiving at a backend portion historical information, regarding multiple features, from a first user and one or more other users, categorizing the information and users as a function of a similarity of certain features of the historical information, receiving at the backend portion current information from the first user, determining a predicted future use as a function of at least some of the historical information and at least some of the current information, and providing a customized recommendation from the backend portion to the first user.

20 Claims, 4 Drawing Sheets

(56)                References Cited

U.S. PATENT DOCUMENTS

| | | |
|---|---|---|
| 10,178,524 B2 | 1/2019 | Chalmers et al. |
| 10,185,999 B1 | 1/2019 | Konrardy et al. |
| 10,204,460 B2 | 2/2019 | Hodges |
| 10,210,771 B2 | 2/2019 | Surpi |
| 10,217,117 B2 | 2/2019 | Heath |
| 10,242,375 B2 | 3/2019 | Bai et al. |
| 10,298,741 B2 | 5/2019 | Goren et al. |
| 10,300,911 B2 | 5/2019 | Shioe |
| 10,319,039 B1 | 6/2019 | Konrardy et al. |
| 10,325,102 B2 | 6/2019 | AthuluruTIrumala |
| 10,332,390 B1 | 6/2019 | Brinkmann et al. |
| 10,373,265 B1 | 8/2019 | Konrardy et al. |
| 10,386,192 B1 | 8/2019 | Konrardy et al. |
| 10,407,078 B2 | 9/2019 | Ratnasingam |
| 10,442,352 B2 | 10/2019 | Zheng et al. |
| 10,445,352 B2 | 10/2019 | Vee et al. |
| 10,445,758 B1 | 10/2019 | Bryer et al. |
| 10,509,792 B2 | 12/2019 | Johnson et al. |
| 10,515,546 B2 | 12/2019 | Kikuchi et al. |
| 10,525,984 B2 | 1/2020 | Seppelt et al. |
| 10,528,837 B1 | 1/2020 | Krishman |
| 10,623,899 B2 | 4/2020 | Watkins et al. |
| 10,633,002 B1 | 4/2020 | Ferguson |
| 10,679,497 B1 | 6/2020 | Konrardy et al. |
| 10,713,494 B2 | 7/2020 | Chang et al. |
| 10,719,885 B1 | 7/2020 | Konrardy et al. |
| 10,777,024 B1 | 9/2020 | Brinkmann et al. |
| 10,782,654 B2 | 9/2020 | Campos et al. |
| 10,870,414 B2 | 12/2020 | Basir et al. |
| 10,895,471 B1 | 1/2021 | Chan et al. |
| 10,904,261 B2 | 1/2021 | Atanda |
| 10,911,909 B1 | 2/2021 | Wilson et al. |
| 10,924,548 B1 | 2/2021 | Karumbunathan et al. |
| 10,929,928 B2 | 2/2021 | Bayley et al. |
| 10,977,601 B2 | 4/2021 | Bowne et al. |
| 10,991,170 B1 | 4/2021 | Binion et al. |
| 11,021,164 B2 | 6/2021 | Tibbitts et al. |
| 11,024,157 B1 | 6/2021 | Nepomuceno et al. |
| 11,037,107 B1 | 6/2021 | Hanson et al. |
| 11,052,821 B2 | 7/2021 | Pedersen |
| 11,059,491 B2 | 7/2021 | Nguyen |
| 11,077,850 B2 | 8/2021 | Green et al. |
| 11,122,391 B2 | 9/2021 | Lundsgaard et al. |
| 11,151,617 B2 | 10/2021 | Wilson et al. |
| 11,157,973 B2 | 10/2021 | Fuchs |
| 11,158,002 B1 | 10/2021 | Brandmaier et al. |
| 11,176,589 B2 | 11/2021 | Pyati |
| 11,176,845 B2 | 11/2021 | Stankoulov |
| 11,188,074 B1 | 11/2021 | Benavidez et al. |
| 11,188,769 B2 | 11/2021 | Kuehnle et al. |
| 11,230,243 B2 | 1/2022 | Kumar et al. |
| 11,242,064 B1 | 2/2022 | Ferguson |
| 11,244,570 B2 | 2/2022 | Farnham, IV et al. |
| 11,254,317 B2 | 2/2022 | Palmer et al. |
| 11,302,176 B2 | 4/2022 | Morgan et al. |
| 11,315,190 B1 | 4/2022 | Brandmaier et al. |
| 11,354,952 B2 | 6/2022 | Barnes et al. |
| 11,441,916 B1 | 9/2022 | Konrardy et al. |
| RE49,232 E | 10/2022 | Strickland et al. |
| 11,574,544 B1 | 2/2023 | Dewey et al. |
| 11,587,368 B2 | 2/2023 | Cordova et al. |
| 11,636,389 B2 | 4/2023 | Elisha et al. |
| 11,694,281 B1 | 7/2023 | Liu et al. |
| 11,720,968 B1 | 8/2023 | Fields et al. |
| 11,735,046 B2 | 8/2023 | Ferguson |
| 2018/0118219 A1 | 5/2018 | Hiei et al. |
| 2018/0144243 A1 | 5/2018 | Hsieh et al. |
| 2018/0144466 A1 | 5/2018 | Hsieh et al. |
| 2018/0165604 A1 | 6/2018 | Minkin et al. |
| 2018/0211551 A1 | 7/2018 | Mayou et al. |
| 2018/0237027 A1 | 8/2018 | Lundsgaard |
| 2019/0005588 A1 | 1/2019 | Carver et al. |
| 2019/0098200 A1 | 3/2019 | Boudreau et al. |
| 2019/0108695 A1 | 4/2019 | Slusar |
| 2019/0141489 A1 | 5/2019 | Abramson et al. |
| 2019/0182176 A1 | 6/2019 | Niewczas |
| 2019/0217865 A1 | 7/2019 | Nothacker et al. |
| 2019/0228654 A1 | 7/2019 | Olsen et al. |
| 2019/0279447 A1 | 9/2019 | Ricci |
| 2019/0317776 A1 | 10/2019 | Walsh et al. |
| 2019/0337533 A1 | 11/2019 | Kume et al. |
| 2020/0135016 A1 | 4/2020 | Julian et al. |
| 2020/0184538 A1 | 6/2020 | Wilson et al. |
| 2020/0193163 A1 | 6/2020 | Chang et al. |
| 2020/0281480 A1 | 9/2020 | Tran |
| 2020/0283011 A1 | 9/2020 | Grossman |
| 2020/0285936 A1 | 9/2020 | Sen |
| 2020/0294403 A1 | 9/2020 | Tong et al. |
| 2020/0312062 A1 | 10/2020 | Balakrishnan et al. |
| 2020/0324769 A1 | 10/2020 | Zheng et al. |
| 2020/0334762 A1 | 10/2020 | Carver et al. |
| 2020/0342548 A1 | 10/2020 | Mazed et al. |
| 2020/0380858 A1 | 12/2020 | Shanahan |
| 2021/0218814 A1 | 7/2021 | Tran |
| 2022/0005291 A1 | 1/2022 | Konrardy et al. |
| 2022/0169258 A1 | 6/2022 | Samarthyam et al. |
| 2022/0207575 A1 | 6/2022 | Wilson et al. |
| 2022/0281454 A1 | 9/2022 | Schürmann et al. |
| 2022/0405625 A1 | 12/2022 | Niewczas |
| 2022/0405808 A1 | 12/2022 | Khoury et al. |
| 2022/0415320 A1 | 12/2022 | Zheng et al. |
| 2023/0017139 A1 | 1/2023 | Roberson et al. |
| 2023/0129685 A1 | 4/2023 | Floyd et al. |
| 2023/0143946 A1 | 5/2023 | Konrardy et al. |
| 2023/0156059 A1 | 5/2023 | Shribman et al. |
| 2024/0127639 A1 | 4/2024 | Cella |
| 2025/0065902 A1* | 2/2025 | Giovanardi ....... B60W 50/0097 |
| 2025/0187619 A1* | 6/2025 | Avedisov ............ B60W 50/082 |

FOREIGN PATENT DOCUMENTS

| | | |
|---|---|---|
| EP | 2483105 B1 | 7/2021 |
| WO | 2023/122708 A1 | 6/2023 |

* cited by examiner

INDIVIDUAL INFORMATION AND RECOMMENDATION SYSTEM FOR VEHICLES

FIELD

The present disclosure relates to systems and methods for providing individualized information and recommendations for vehicle users.

BACKGROUND

Vehicle users often have a need for recommendations that are relevant not only to past data from the user, but for recommendations that are relevant to the real-time use of the vehicle and updated user preferences and requirements. It is challenging to deliver relevant information that caters to user preferences, behavior patterns, and safety needs with real-time, context-aware recommendations. This lack of relevant results and real-time recommendations can result in suboptimal driving experiences, inefficient route choices, and missed opportunities for improving safety.

SUMMARY

In at least some implementations, a method for providing customized information to a user, that includes receiving at a backend portion historical information, regarding multiple features, from a first user and one or more other users, categorizing the information and users as a function of a similarity of certain features of the historical information, receiving at the backend portion current information from the first user, determining a predicted future use as a function of at least some of the historical information and at least some of the current information, and providing a customized recommendation from the backend portion to the first user.

In at least some implementations, the similarity of certain features is determined using a cosine similarity function.

In at least some implementations, a category of users is formed for users that operate a similar type of vehicle. In at least some implementations, wherein the similar type of vehicle includes the same make and model of vehicle.

In at least some implementations, the predicted future use is based at least in part on historical data from the first user, historical data from other users, and current data from the first user. In at least some implementations, the current data from the first user includes one or more of the current location of the vehicle of the first user, the current vehicle operating parameters of the vehicle of the first user, and current environment information in a geographic area of the vehicle of the first user. In at least some implementations, the current vehicle operating parameters includes data from one or more vehicle sensors.

In at least some implementations, the method also includes receiving at the backend portion information about one or more environmental conditions.

In at least some implementations, the historical data is rated by one or more algorithms that include a collaborative filter and a content-based filter. In at least some implementations, the collaborative filter represents customer interactions with vehicles in a matrix, where rows of the matrix represent customers/users, columns in the matrix represent vehicles, and the matrix cells contain customer ratings or interactions. In at least some implementations, the content-based filter represents vehicles and users as feature vectors, where each feature corresponds to a characteristic of the vehicles or the users. In at least some implementations, the content-based filter includes calculating a similarity between a first vehicle and a second vehicle based on their feature vectors.

In at least some implementations, the method also includes making a customer-item prediction based on the similarity between preferences of the first user and predetermined features of an item, and wherein the customized recommendation is made based at least in part on the customer-item prediction.

In at least some implementations, a system of a vehicle for determining customized recommendations, including one or more vehicle sensors, a control system that includes a data storage unit and an electronic control unit, the control system being in communication with the one or more vehicle sensors, a communications unit that is communicated with the control system and that has a receiver by which information is received at a network vehicle and a transmitter by which information is transmitted from the network vehicle, and a backend portion of a cloud-based system, wherein the backend portion includes a processor and memory with programming to:

categorize historical information, regarding multiple features, from a first user and one or more other users as a function of a similarity of certain features of the historical information;

determine a predicted future use as a function of at least some of the historical information and at least some current information from the first user; and provide a customized recommendation from the backend portion to the first user based at least in part on the predicted future use.

In at least some implementations, the historical data is rated by one or more algorithms that include a collaborative filter and a content-based filter. In at least some implementations, the collaborative filter represents customer interactions with vehicles in a matrix, where rows of the matrix represent customers/users, columns in the matrix represent vehicles, and the matrix cells contain customer ratings or interactions.

In at least some implementations, the content-based filter represents vehicles and users as feature vectors, where each feature corresponds to a characteristic of the vehicles or the users. In at least some implementations, the content-based filter includes calculating a similarity between a first vehicle and a second vehicle based on their feature vectors.

In at least some implementations, the programming is also set up to make a customer-item prediction based on the similarity between preferences of the first user and predetermined features of an item, and wherein the customized recommendation is made based at least in part on the customer-item prediction.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
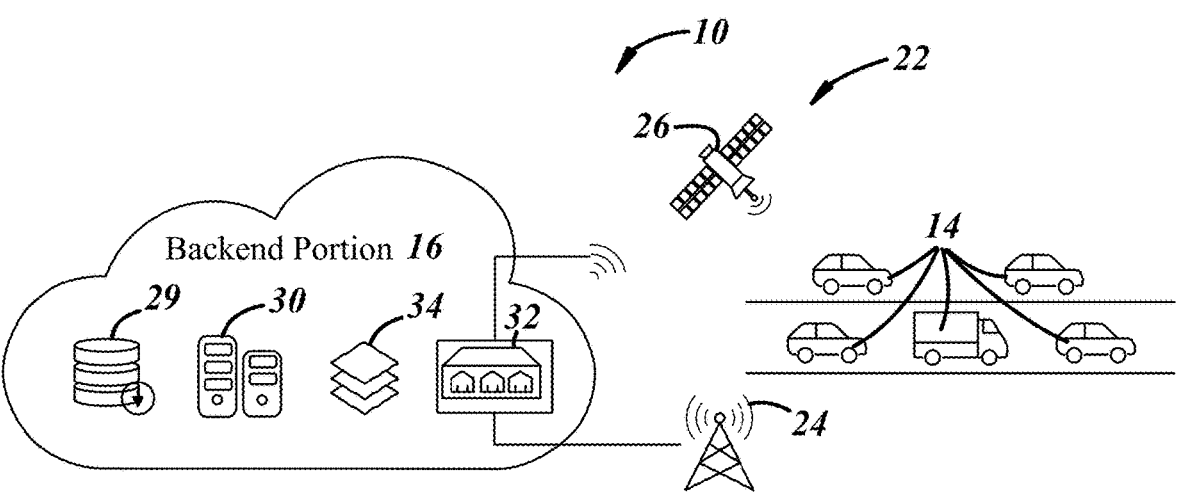
FIG. 1 is a diagrammatic view of a system for determining customized recommendations for a vehicle user.
Figure 2:
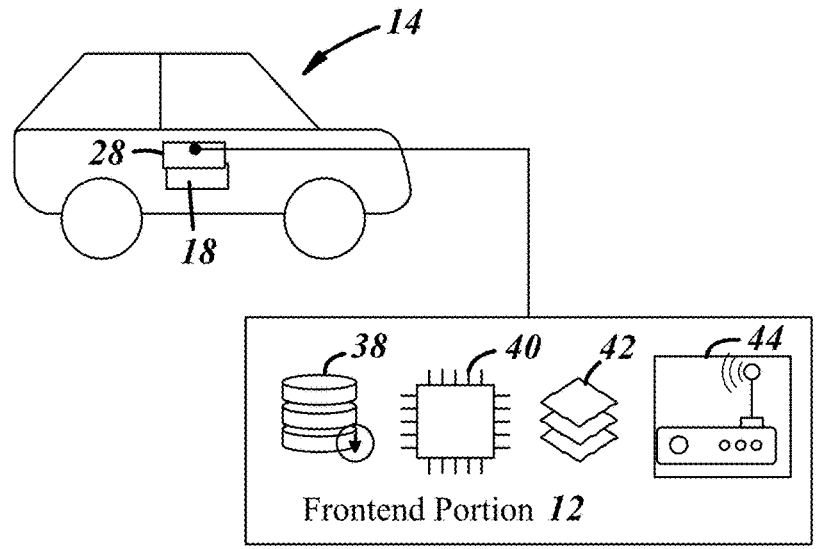
FIG. 2 is a diagrammatic view of a vehicle that defines part of the system.

Referring in more detail to the drawings, FIGS. 1 and 2 illustrate a vehicle information system 10 including a frontend portion 12 with one or more network vehicles 14 that are in communication with a backend portion 16 via one or more communication devices and suitable communication protocols. The network vehicles include in-vehicle infotainment (IVI) systems 18 (FIGS. 3 and 4) that utilize a combination of software and hardware components to provide a wide range of information, system controls and entertainment. As diagrammatically shown in FIGS. 3 and 4, the IVI system 18 may include one or more display screens 20 and a user interface 21. As described herein, the information system 10 utilizes a wide range of data and parameters to provide context relevant, custom recommendations and responses to a user 23 (FIG. 4) of a vehicle.

With reference to the schematic block diagrams in FIGS. 1 and 2, the vehicle information system 10 may be a cloud-based system that may receive incoming information from individual ones of the network vehicles 14 and send outgoing information to multiple network vehicles 14, where the outgoing information may include mass notifications that are the same for multiple vehicles or individual notifications that are each specific to the vehicle to which each individual notification is sent. The system 10 may gather real-time information from network vehicles 14, and the system 10 may analyze the information and determine if a notification should be sent to one or more vehicles as noted in more detail later.

The term "real-time", as used herein, does not strictly require that such information and notifications be generated, sent, received and/or otherwise processed at the exact moment when their underlying events or conditions occur in order to be "real-time". Rather, these terms broadly include any such information and notifications that are generally contemporaneous with their underlying events or conditions so that the environmental conditions information and notifications are still relevant or accurate in the context of the present system and method (e.g., within seconds, minutes or even hours of their underlying events or conditions).

System 10 may deliver hosted services via the internet and/or other communication networks and may be structured as a public, private or hybrid cloud, for example. According to one non-limiting example, vehicle information system 10 is structured as a private cloud and generally includes the backend portion 16 and the frontend portion 12 that is distributed across a fleet of network vehicles 14, where each network vehicle 14 is capable of obtaining and providing information as well as communicating with the backend portion 16 over a secure communications network 22 (e.g., secure vehicle-to-cloud (V2C) network). The secure communications network 22 may include a cellular-based network 24, a satellite-based network 26, a city-wide WiFi-based network, some other type of communications network and/or a combination thereof. Although only a few network vehicles 14 are shown in the drawings, it should be appreciated that system 10 may interact with a large fleet of vehicles that can include dozens, hundreds, thousands or even more vehicles. System 10 may be used with any vehicles, including (but not limited to) passenger, commercial and/or public transportation vehicles sold in any geographic area.

Backend portion 16 may include any suitable combination of software and/or hardware resources typically found in a backend of a cloud-based system, as best illustrated in FIG. 1. The backend portion 16 may be responsible for managing some of the programs and algorithms that run applications on the frontend portion 12, such as those that request, obtain and optionally analyze information of and from the network vehicles 14. It is noted that the data/information used to formulate recommendations may be analyzed by control systems 28 and processors on-board a network vehicle 14 or by the backend portion 16 or both, as desired. The backend portion 16 may be managed or controlled by the vehicle manufacturer and can be part of a larger cloud-based system that the vehicle manufacturer uses to communicate and interact with a large fleet of vehicles for a multitude of purposes. For example, the backend portion 16 may include or communicate with emergency alert systems, such as those that provide Amber alerts or other missing persons alerts, or law enforcement systems that may provide and receive information regarding vehicles of interest to them.

The backend portion 16 may include any suitable combination of software and/or hardware resources including, but not limited to, components, devices, computers, modules and/or systems such as those directed to applications, service, storage, management and/or security (each of these resources is referred to herein as a "backend resource," which broadly includes any such resource located at the backend portion 16). In one example, the backend portion 16 has a number of backend resources including data storage systems 29, processors or servers 30, communication systems 32, programs and algorithms 34, as well as other suitable backend resources. It should be appreciated that backend portion 16 is not limited to any particular architecture, infrastructure or combination of elements, and that any suitable backend arrangement may be employed.

Frontend portion 12 may include any suitable combination of software and/or hardware resources typically found in a frontend of a cloud-based system, as shown in FIG. 2, and is generally responsible for sending information to the backend portion and receiving notifications, programs, instructions and the like from the backend portion 16. Depending on the particular arrangement, the frontend portion 12 may also be responsible for gathering camera, sensor, location and/or other data from devices on the vehicle 14 and sending such information to the backend portion 16. The frontend portion 12 is typically responsible for running the applications that interface with the users in the different vehicles 14, and for interfacing with the programs and algorithms 34 of the backend portion 16. The frontend portion 12 may also be managed or controlled by the vehicle manufacturer and can be part of a larger cloud-based system that the vehicle manufacturer uses to communicate and interact with a large fleet of vehicles for various purposes, as mentioned above. The frontend portion 12 may be distributed across one or more vehicles 14 and may include any suitable combination of software and/or hardware resources including, but not limited to, components, devices, computers, modules and/or systems (each of these resources is referred to herein as a "frontend resource," which broadly includes any such resource located at the frontend portion 12).

In one example, the frontend portion 12 has a number of frontend resources including a vehicle control system 28 having one or more vehicle electronic module(s) installed in vehicles 14, which may include some combination of a data storage unit 38, an electronic control unit and/or processor(s) 40, applications 42, a communications unit 44 (e.g., one that includes a telematics unit and/or other communication devices with a receiver by which information is received at unit 44 and a transmitter by which information is sent from the unit 44), as well as other suitable frontend resources. The control system 28 may be or include a telematics control module (TCM), a telematics box module (TBM), a body control module (BCM), an electronic control unit (ECU), an infotainment control module, or any other suitable module known in the art. It is not necessary for the preceding units to be packaged in a single vehicle electronic module, as illustrated in FIG. 2; rather, they could be distributed among multiple vehicle electronic modules, they could be stand-alone units, they could be combined or integrated with other units or devices, or they could be provided according to some other configuration. It should be appreciated that frontend portion 12 is not limited to any particular architecture, infrastructure or combination of elements, and that any suitable frontend arrangement may be employed.

In order to perform the functions and desired processing set forth herein, as well as the computations therefore, the control system 28 may include, but is not limited to, one or more controller(s), control unit(s), processor(s), computer(s), DSP(s), memory, storage, register(s), timing, interrupt(s), communication interface(s), and input/output signal interfaces, and the like, as well as combinations comprising at least one of the foregoing, as generally described with regard to the frontend portion 12. For example, the control system 28 may include input signal processing and filtering to enable accurate sampling and conversion or acquisitions of such signals from communications interfaces and sensors. As used herein the terms control system 28 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 28 may be distributed among different vehicle modules, such as an infotainment control module, engine control module or unit, powertrain control module, transmission control module, and the like, if desired, and the memory and one or more processors may be one or both integrated into the vehicle 14 or remotely located and wirelessly communicated to the vehicle 14, as desired.

The term "memory" or "storage" or "data storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

To control various functions of the vehicle 14, the vehicle control system 28, among other things, monitors and provides controls for operation of various vehicle systems. For example, the vehicle 14 may include drive by wire, brake by wire and steer by wire systems, or the drive, brake and steering systems may be mechanically linked, as desired, and the control system 28 may be programmed or include instructions to respond to driver action, such as movement of the throttle, and brake and steering inputs. The magnitude of the power output from the powertrain system and brake system varies as a function of the driver operation of the throttle and brake inputs, as well as the instructions executed by the control system 28, which may vary in different circumstances and may be implemented in view of variables and by way of look-up tables, maps, algorithms and the like. Further, these systems may be operated partially or fully-autonomously, as desired.

Figure 3:
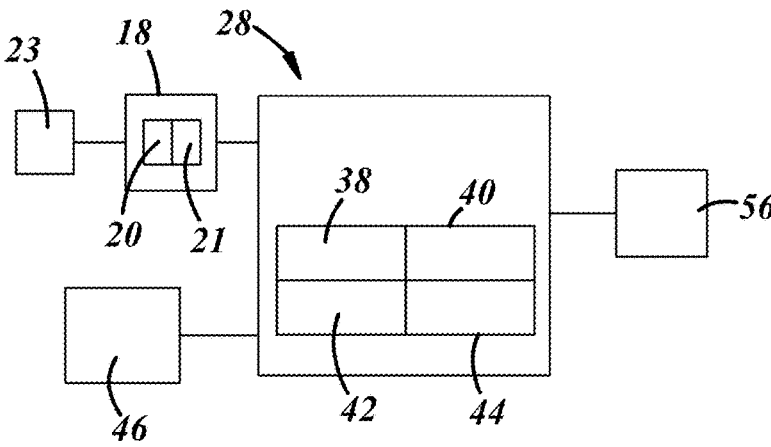
FIG. 3 is a diagrammatic view of a vehicle control system which may define part of a frontend portion of the system.

To enable control and monitoring of various vehicle operating, environmental and other conditions related to vehicle operation, the control system 28 may include or be communicated with a range of sensors 46, shown diagrammatically in FIG. 3. By way of some examples, the vehicle 14 may include: a speed sensor that provides an indication of vehicle speed; one or more accelerometers responsive to vehicle accelerations in various directions and orientations; wheel speed sensors responsive to the rotational speed of the vehicle wheels; drive input sensors that sense the position and/or rate of movement of the throttle, brake and/or steering inputs; position or location sensors or devices (such as GPS or the like) to determine the location of the vehicle; temperature sensors for various things like ambient temperature, engine/motor temperature, and the like; fuel level sensor; battery sensor (voltage, charge level, or the like); an odometer; tire pressure sensors and other sensors that may be responsive to or useful in controlling vehicle operation (e.g. current draw of motors, torque sensors, steering sensors, etc). The vehicle may include object detection sensors like cameras, radar, lidar and other sensors, and these sensors may provide information about the vehicle and the surrounding environment. These sensors and data sources may provide dynamic vehicle data 52 or operating parameters and environmental information 54, shown as some of the information types in FIG. 8.

Various navigation programs 56 (FIG. 3) are known that compute a travel path to a destination, and convey information about the travel path to a driver in the form of visual and/or audible instructions for navigating the vehicle 14 along the travel path. The navigation programs can use information from the vehicle location sensor (e.g. GPS), a remote device location sensor (e.g. GPS chip of a smartphone in the vehicle) and map data and information relating to road conditions, speed limits, location of intersections and traffic signals, and the level of traffic (such as is available from Waze, GoogleMaps, TomTom maps, and other applications and sources). This information can be used to define travel paths that are shortest in total distance or time, or that avoid certain road types (e.g. not paved, toll roads, etc) or areas where travel time is less certain, for example, construction zones. The navigation programs 56 may be integrated into the vehicle control system 28 or infotainment system (which may be considered part of the control system), and/or can be resident on a mobile device that is connected to the vehicle 14 by wired or wireless connection.

Additional vehicle related data may include, by way of non-limiting examples, information about age and type of vehicle which may include information related to the size, weight and performance characteristics of the vehicle such acceleration, braking, steering, suspension characteristics. Diagnostics data, repair history data, recall information, warranty information, preferred or recommended mainte- nance schedules and information, and other information may also be provided for each vehicle. This may be called background vehicle data 58 (FIG. 8) and with the dynamic vehicle data 52 may be more generally be called vehicle data.

User data 60 may also be included in the information system 10. This information may include, by way of non-limiting examples, information about the owner or driver, including residence information, historical driving data, travel patterns like frequency of vehicle use, frequently visited locations, vehicle use by times of day and time of year, infotainment system usage, vehicle systems prefer- ences and settings selected by the user, information about subscription services selected by the user, dealership or service center preference(s), and the like.

Further, user data 60 may include preferences of the user that may be input into the system 10 by the user, for example via an internet interface on a remote device 62 (e.g. phone, tablet, computer), or learned by the information system based upon user interaction with the vehicle and IVI system 18 over time, as noted later. The preferences can relate to, by way of non-limiting examples, fuel brands, restaurants, hotels, vehicle service centers, car accessory brands or type, music/entertainment/social media, hobbies, retail stores, stocks, sports teams, preference for paid or free services and applications, and other information. User data 60 may also include interaction information such as prior sales or pur- chase information, call center interactions, social media activity and other information.

Next, external data 64 may be provided to and used in the analysis by the information system 10. External data 64 may include, by way of non-limiting examples, mobility services, insurance information, lease and other financial data, data from other, similar vehicles, data from third parties (e.g. sales, promotions, general information), information about the terrain and environment, map data including information about the geography, businesses, road and the like, traffic information, status of orders or deliveries requested by the user, and the like.

One or more of the vehicle data, user data and external data may be used to segment or categorize users in one or more user groups 66 including people with similar informa- tion for certain parameters. For example, people may be grouped by type of vehicle, where they live, type of roads they primarily drive on (e.g. highways, city roads, etc), driving habits (fast, slow, aggressive, energy conscious, etc), frequency of driving, typical length of vehicle trips, types of locations visited, most frequent locations, and so on. Groups 66 may be formed for any desired characteristic, such as music preferences, podcasts listened to, web/software appli- cations purchased or used, hobbies, shopping data, sports teams, and based on the external information. In this way, a wide variety of groups or categories may be developed and used for different purposes, and a user may be categorized in many different groups, and the analyses described herein may utilize information from a single group or multiple groups in a given analysis and to arrive at a certain recom- mendation that may be communicated to users. This may be done because users in similar circumstances and/or with similar interests may provide data and facilitate recommen- dations that may be of interest to other users in the same or similar groups. In this way, data from a wide range of users, as well as from individual users to whom recommendations are made, can be used to provide custom, personalized recommendations to individual users. The recommendations can be made based on real-time vehicle use data, real-time user inputs and historical information and preferences, for example.

Figures 7, 8:
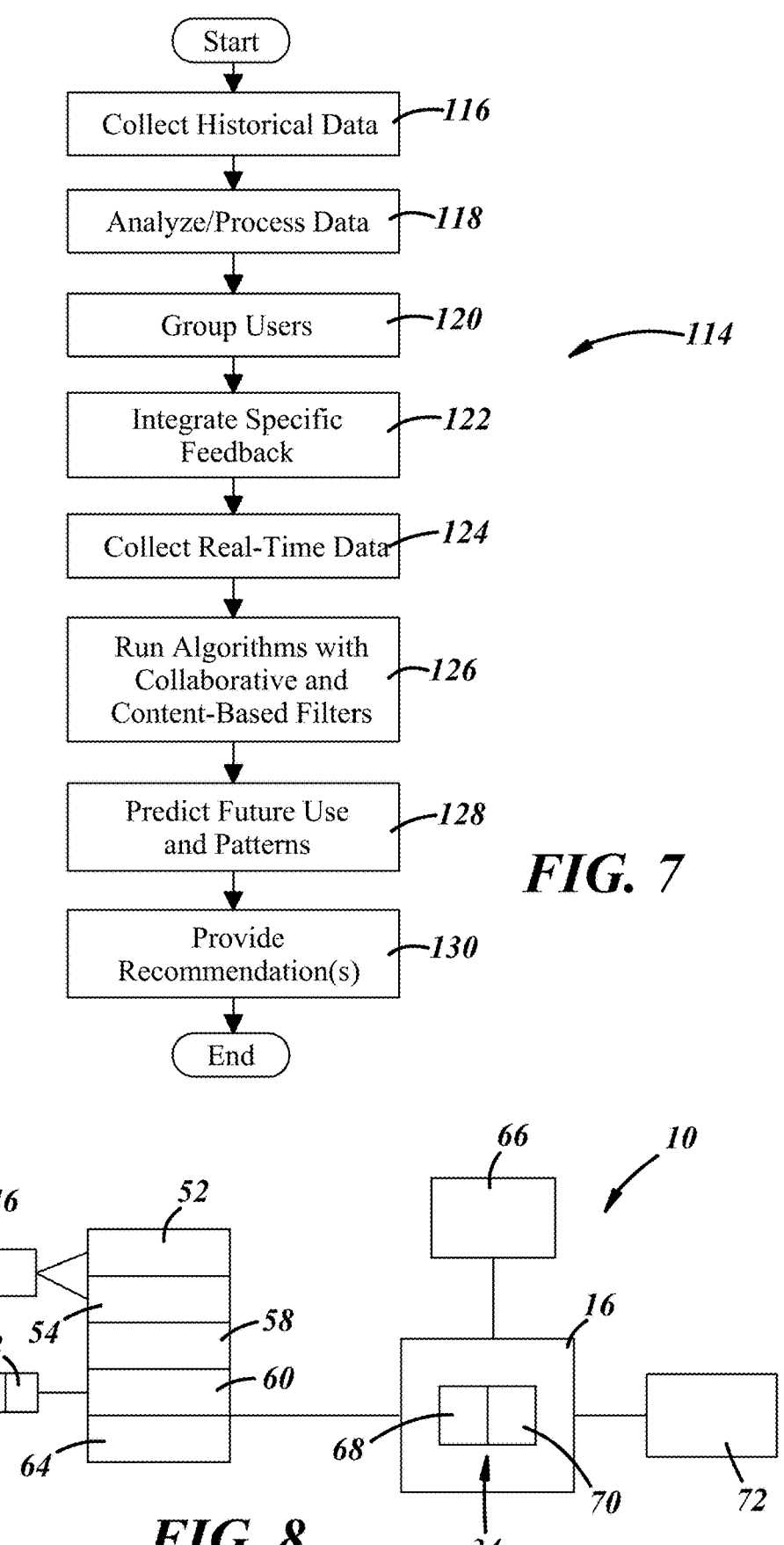
FIG. 7 is a flowchart of a method for providing individualized recommendations to a vehicle user.
FIG. 8 is a diagrammatic view of information sources and programs of the system.

The backend portion 16 may include one or more AI/ma- chine learning algorithms 34 for personalized learning and vehicle-customer modeling, to analyze data and provide customized recommendations for users based on their pref- erences, usage patterns and behaviors, and taking into account information from groups of users as is determined to be relevant to a recommendation (where relevance may be determined with a similarity rating or score, as noted herein, for example). The algorithm(s) 34 may be designed to continually refine and filter the data to improve future recommendations as more data is collected and a user's preferences and habits are better defined. In at least one implementation, as shown in FIG. 8, the algorithm(s) 34 include collaborative filtering 68 and content-based filtering 70.

Collaborative filtering 68 represents customer interactions with vehicles in a matrix, where rows of the matrix represent customers/users, columns in the matrix represent vehicles, and the matrix cells contain customer ratings or interactions. Customer similarity may be determined based on their ratings and/or interactions from the matrix. In one example, a cosine similarity between customers "u" and "v" may be determined as follows:

$$\text{Cosine Similarity}(u, v) = \frac{\sum_i R_{u,i} \cdot R_{v,i}}{\sqrt{\sum_i (R_{u,i})^2} \sqrt{\sum_i (R_{v,i})^2}}$$

A similar analysis can be performed to determine similarity between two vehicles, as well. Next, a customer-item pre- diction or rating can be determined for a customer "u" and an item "i" using weighted averages of the interactions with item "i" by similarly rated customers, as follows:

$$\widehat{R_{u,i}} = \frac{\sum_v \text{Cosine Similarity}(u, v) \cdot R_{v,i}}{\sum_v \text{Cosine Similarity}(u, v)}$$

In this way, the desirability of an item to a customer can be determined based on one or more of the customer similarity, vehicle similarity and the customer-item prediction.

The content-based filtering 70, in at least some imple- mentations, represents vehicles and customers as feature vectors, where each feature corresponds to a characteristic or attribute (e.g., vehicle specifications, customer/user prefer- ences). This filtering 70 may include calculating the simi- larity between vehicles "i" and "j" based on their feature vectors (e.g., cosine similarity), as follows:

$$\text{Cosine Similarity (vehicle } i, \text{ vehicle } j) = \frac{\text{feature vetcor of vehicle } i \cdot \text{feature vetcor of vehicle } j}{\|\text{feature vetcor of vehicle } i\| \cdot \|\text{feature vetcor of vehicle } j\|}$$

Further, a customer-item prediction or rating can be done for a customer "u" and an item "i" based on the similarity between the customer's preferences and the item's features.

The items may be software applications available in an app store accessible from the IVI system 18 and usable via the IVI system 18, restaurants, stores, refueling stations, points of interest/tourist locations, and so on. And the features of the items may be information within the system as external data 64. For example, the type of restaurant, average cost of a meal, type of application (game, vehicle utility, etc) and whatever relevant features for each item may be data known to the system to facilitate matching users to items and making recommendations to users accordingly. Then, the content-based filtering 70 may determine weighted average of feature/item similarities, as follows:

$$R_{u,i}^{\sim} = \frac{\sum_j \text{Cosine Similarity (customer } u, \text{ vehicle } j) \cdot \text{Cosine Similarity (vehicle } i, \text{ vehicle } j) R_{u,j}}{\sum_j \text{Cosine Similarity (customer } u, \text{ vehicle } j) \cdot \text{Cosine Similarity (vehicle } i, \text{ vehicle } j)}$$

In at least some implementations, a hybrid mathematical approach is utilized, and the approach uses a weighted linear combination of collaborative filtering (CF) 68 and content-based filtering (CBF) 70 predictions, where the weights are hyperparameters that can be tuned during the model training process:

$$R_{u,i}^{\sim} = \alpha \cdot \hat{R}_{u,i}^{CF} + (1 - \alpha) \cdot \hat{R}_{u,i}^{CBF}$$

Here, $\alpha$ is the weight for CF predictions, and $(1-\alpha)$ is the weight for CBF predictions. The variable $\alpha$ may be chosen through techniques like cross-validation to optimize recommendation accuracy.

This hybrid approach can leverage both consumer-item interactions (e.g. from the collaborative filtering 68) and item features (used in the content-based filtering 70) to make personalized recommendations that take into account consumer preferences, usage, and behavior patterns along with the characteristics of the vehicles and the items being recommended. Further, by incorporating both vehicle sensor data (e.g. real-time vehicle operating parameters and environment information) and user/driver feedback, preferences, and behavior patterns the information system 10 can create highly personalized and context-aware recommendations 72 for vehicles and users. This approach enables recommendations 72 to be adapted to changing conditions and changing consumer preferences and needs, enhancing the overall consumer experience with a continually updated and responsive system.

User interaction with the information system can occur via the IVI system 18, and in particular, a head-unit or main console thereof which may include one or more display screens 20 and the user interface 21. The user interface 21 may include one or more inputs that may be provided in one or more forms, such as but not limited to, touch responsive portions of a display, one or more manually actuated inputs (e.g. dials, buttons or switches), and/or audio inputs including a microphone via which verbal inputs can be given by a user.

The IVI system 18 may display various items and options that may be selected by a user. By way of some non-limiting examples, the items and options may include menu options of vehicle settings and preference menus (for control of heating and cooling options, audio video settings and preferences, door lock functionality, performance settings (sport, eco, etc) and various other settings), program icons displayed for included or embedded apps that may be selected by a user and run by the system, such as via a web portal or application programming interface (API). The system may include programs or "apps" or "web widgets" that may relate to a wide range of tasks and features, such as but not limited to, navigation, audio/video, social media, interaction with paired devices, text messaging, phone use, shopping, restaurants, reviews (e.g. Yelp), and an app store via which apps may be downloaded or updated.

Figure 4:
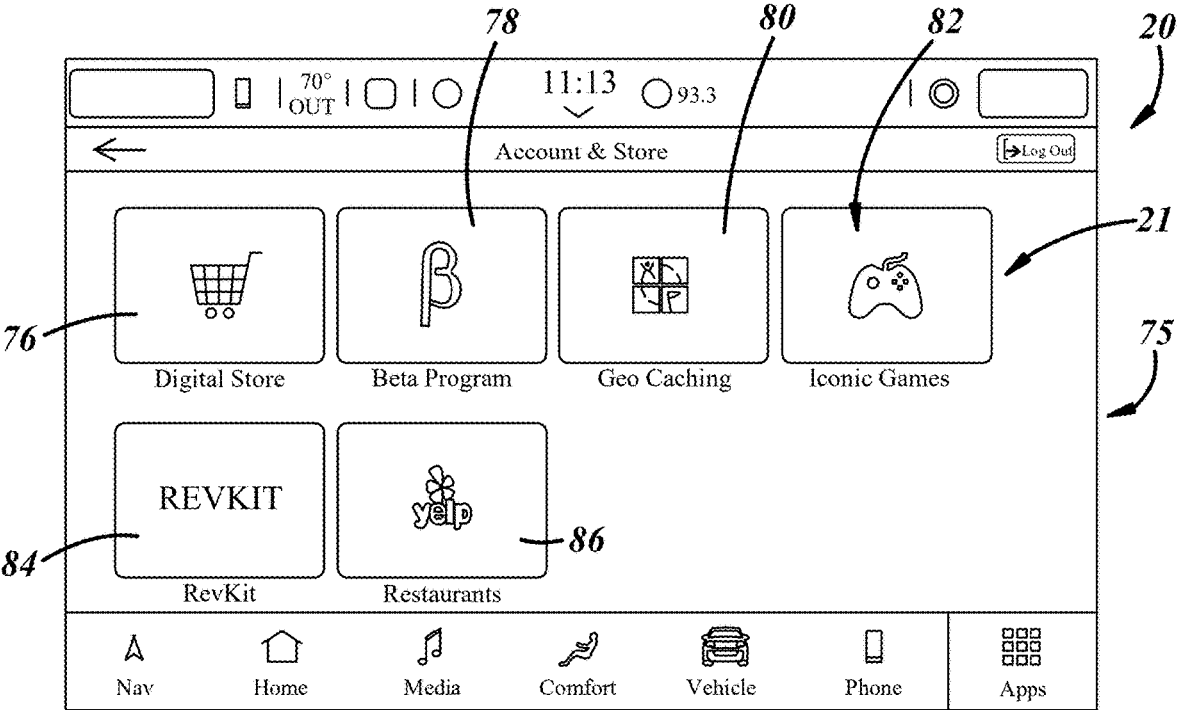
FIGS. 4-6 are representative screenshots from the display of an in-vehicle infotainment system that may define part of the frontend portion of the system.
Figure 5:
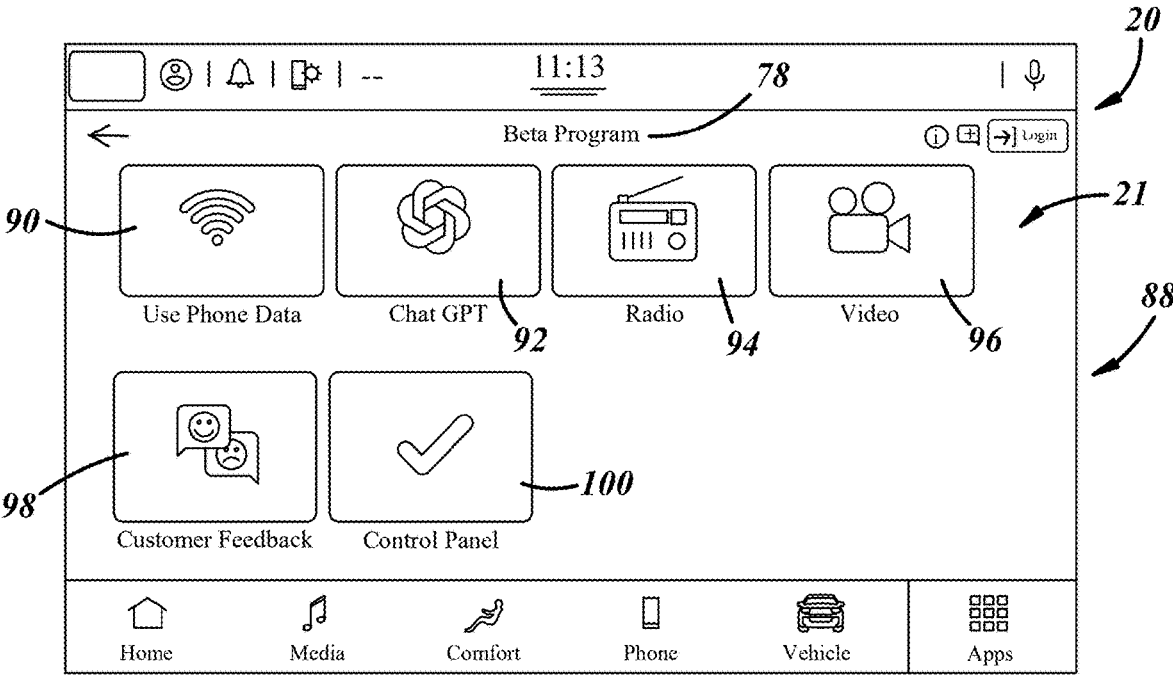
Figure 6:
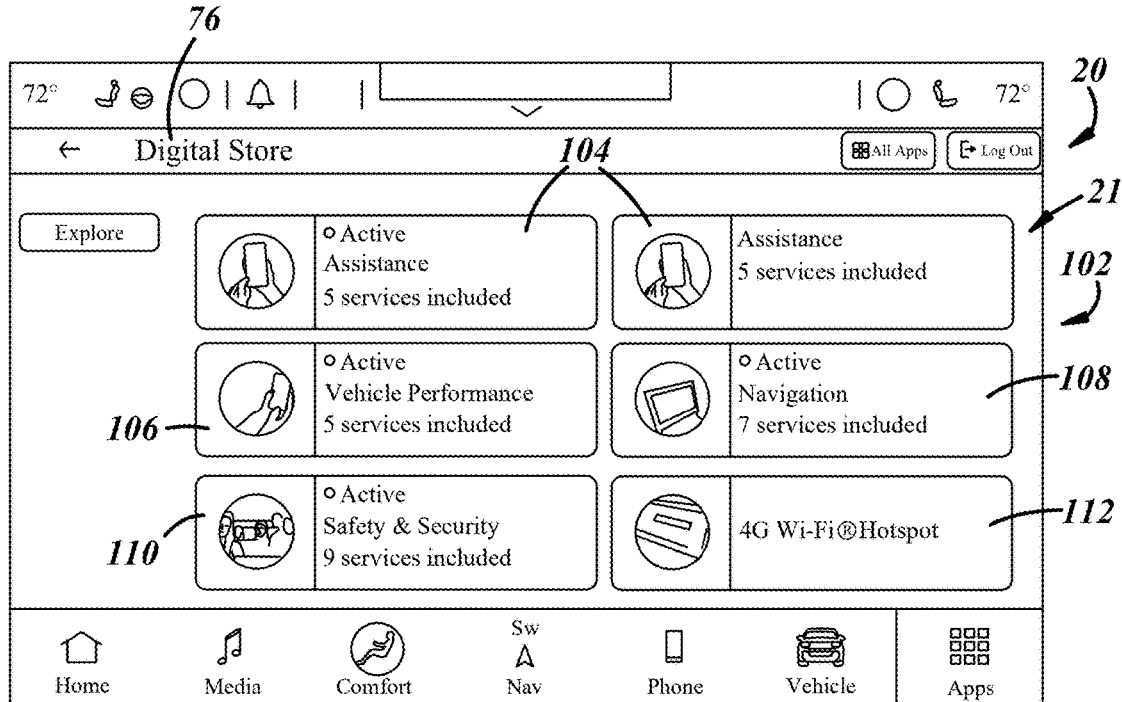

FIG. 4 shows a screenshot 75 for a representative display 20 including icons for a Digital Store 76, Beta Program 78, Geo Caching 80, Iconic Games/games 82, RevKit 84 and a Yelp™ app 86. FIG. 5 shows a screenshot 88 for the Beta Program 78 which includes options to use phone data for an internet connection 90, ChatGPT 92, Radio 94, Video 96, Customer Feedback 98 and Control Panel 100. FIG. 6 shows a screenshot 102 for the Digital Store app 76, with menu options for vehicle service and option subscriptions and related interfaces therefore, examples include Assistance 104, Vehicle Performance 106, Navigation 108, Safety and Security 110, and WiFi Hotspot 112 use. These items may include submenus and further information on additional screens, in a known manner. In this way, the IVI system 18 may be used to manage subscriptions to various programs, features or options, and permit use of at least some such programs, features or options.

The control system 28 may provide information to the backend portion 16 and receive information from the backend portion 16. Some of the information received from the backend portion 16 may include recommendations 72 or other messages to be displayed to a user via the IVI system 18, or a paired device. The recommendations 72 may be generated as noted herein, including as a function of real-time or current vehicle parameters and driving parameters.

The recommendations 72 may be provided by a program 34 of the backend portion 16, in response to some condition or conditions being met, or in response to a specific request by a user. The user may, via an app, program interface or via an input of the IVI system 18 (e.g. a manual entry or an audio input via a microphone) or a paired or remote device, request a recommendation. For example, a user may request a recommendation for a certain type of restaurant near the user's current location or a planned future location, or a music recommendation or for an app that has a certain feature, and so on. The request is sent to the backend portion, analyzed, and a response is generated and communicated back to the vehicle IVI system 18 or paired or remote device.

In at least some implementations, the vehicles 14 may transmit data/information during operation, at certain intervals or in a stream that may occur continuously during vehicle operation and not just upon occurrence of an initiating event that causes the control system 28 to initiate a transmission. Thus, the vehicles 14/control systems 28 can be programmed to transmit data in the ordinary course of vehicle use and regarding numerous vehicle operating parameters. The data can be captured or logged by the backend portion 16 and some analysis conducted. When the status of different vehicle features or systems changes (e.g. on/off or activated/deactivated or activated and adjusted), the data provided from the vehicle 14 may include the numerous vehicle operating parameters and also data indicative of the feature or system status change. The backend portion 16 may then determine occurrence of the feature or system status change and execute methods or programs in accordance with predetermined programs or instructions. The data may be transmitted in any desired format, and for efficiency of computational resources, may be provided in a binary code stream from the vehicle 14 to the backend portion 16, and the backend portion 16 may include programming to decipher/interpret the binary code.

When one or more conditions are met, the backend portion 16 may communicate information, which may include one or more recommendations 72, to one or more vehicles 14 for which the information is determined to be relevant. The information can be provided to the vehicle 14 for presentation to or review by a vehicle occupant in any desired way. The notice can be provided on a vehicle display 20, such as in a pop-up window including text, graphic(s), animation(s), etc., in an audio file played by the vehicle infotainment system 18, or provided to a remote device that is paired or otherwise connected to the vehicle control system 28 for audible or visual presentation, or by some combination of these non-limiting examples.

FIG. 7 illustrates a method 114 incorporating certain features of this disclosure. The method may begin at step 116 in which historical and other background data is collected. The information may come from various sources, including users, vehicles, other sources (like news, weather, GPS/navigation systems, vehicle manufacturers, vehicle service centers, etc). This step may occur continuously as additional vehicles and users and other sources provide updated and/or additional information, and as real-time usage data is collected and analyzed and used to update the models and algorithms, and then may be included as historical data in future iterations.

Next, in step 118, historical data is processed (which may include normalization and filtering) and analyzed at the backend portion 16. The information may be logged or categorized in many ways that it is relevant, such as but not limited to the specific vehicle, vehicle type, time, location, app or other source from which the information was sent, and so no.

In step 120, the users may be grouped or segmented based on various traits or features, as noted herein. In step 122, user specific feedback may be integrated into the system to provide a weighting for one or more features or items as directed by a specific user to whom a recommendation is to be provided. And in step 124, real-time or current information may be collected. This information may include, for example, vehicle operating parameters, vehicle location, time, type of app or source providing the information and the like.

The historical, user specific and real-time information may be analyzed in step 126 by one or more algorithms to characterize or score the information, such as by the collaborative and content-based filters described herein. This step may be run at various times, for example, to enable grouping of users, segmenting or analysis of historical data, to predict future use and use patterns, as in step 128, and to provide a recommendation (e.g. information) in step 130 that is based on one or more of the information sources and types.

The models and algorithms may be trained with initial data sets and updated continuously or as desired, as additional information is provided in the system and as feedback about past information and recommendations are factored into the models to improve the relevance and accuracy of future recommendations. In this way, the system can provide customized recommendations to each user of the system based on user specific historical and current/real-time data, as well as crowd sourced historical data, and data from other sources. The analyses and data and model refinement may be done by the backend portion, data transmission to and from the backend portion may be done seamlessly to the users with or without user request for recommendations, and the recommendations can be provided in a convenient way via the IVI system 18, and, in at least some implementations, with an integrated web interface of the IVI system 18 that enables a wide range of options and features for users.

The various method steps may be carried out in a different order, and steps may be repeated one or more times, at different times, during performance of the method. For example, the filtering and algorithm analyses can be done at different times for the same or different data sets and types of information, as desired.

What is claimed is:

1. A method for providing customized information to a user, comprising:

receiving at a backend portion historical information, regarding multiple features, from a first user and one or more other users wherein the features include specifications of the vehicle used by the first user and vehicles used by the one or more other users, user preferences, and one or more of user feedback related to the vehicle and user interaction with items related to one or more of vehicle navigation, audio/video, social media, interactions with devices paired with the vehicles, text messaging, phone use, shopping, restaurants, and feedback regarding one or more of the items;

categorizing the historical information and the first user and the one or more other users as a function of a similarity of the historical information in multiple categories relating to the features, with the first user and the one or more other users placed within user groups based on similarities in the categorized historical information of the first user and the one or more other users with others of the one or more other users;

receiving at the backend portion current information from the first user;

determining a predicted future use as a function of at least some of the categorized historical information and at least some of the current information; and providing a customized recommendation from the backend portion to the first user.

2. The method of claim 1 wherein the similarity of certain features is determined using a cosine similarity function.

3. The method of claim 1 wherein a category of users is formed for users that operate a similar type of vehicle.

4. The method of claim 3 wherein each user is categorized in multiple groups with some groups including users having similar historical information relating to subject matter other than the type of vehicle.

5. The method of claim 1 wherein the predicted future use is based at least in part on historical data from the first user, historical data from other users, and current data from the first user.

6. The method of claim 5 wherein the current data from the first user includes one or more of the current location of the vehicle of the first user, the current vehicle operating parameters of the vehicle of the first user, and current environment information in a geographic area of the vehicle of the first user.

7. The method of claim 6 wherein the current vehicle operating parameters includes data from one or more vehicle sensors.

8. The method of claim 1 which also includes receiving at the backend portion information about one or more environmental conditions.

9. The method of claim 1 wherein the historical data is rated by one or more algorithms that include a collaborative filter and a content-based filter.

10. The method of claim 9 wherein the collaborative filter represents customer interactions with vehicles in a matrix, where rows of the matrix represent customers/users, columns in the matrix represent vehicles, and the matrix cells contain customer ratings or interactions.

11. The method of claim 9 wherein the content-based filter represents vehicles and users as feature vectors, where each feature corresponds to a characteristic of the vehicles or the users.

12. The method of claim 11 wherein the content-based filter includes calculating a similarity between a first vehicle and a second vehicle based on their feature vectors.

13. The method of claim 1 which also includes making a customer-item prediction based on the similarity between preferences of the first user and predetermined features of an item, and wherein the customized recommendation is made based at least in part on the customer-item prediction.

14. A system of a vehicle for determining customized recommendations, comprising:

one or more vehicle sensors;

a control system that includes a data storage unit and an electronic control unit, the control system being in communication with the one or more vehicle sensors;

a communications unit that is communicated with the control system and that has a receiver by which information is received at a network vehicle and a transmitter by which information is transmitted; and a backend portion of a cloud-based system, wherein the backend portion includes a processor and memory with programming to:

categorize historical information, regarding multiple features, from a first user and one or more other users as a function of a similarity of certain features of the historical information, wherein categorizing includes rating the historical information of each of the users and placing each of the users into multiple groups wherein each group includes users with a similar rating for one or more category of the historical information;

determine a predicted future use as a function of at least some of the categorized historical information, as a function of information relating to one or more of the multiple groups, and at least some current information from the first user; and provide a customized recommendation from the backend portion to the first user based at least in part on the predicted future use.

15. The system of claim 14 wherein the historical data is rated by one or more algorithms that include a collaborative filter and a content-based filter.

16. The system of claim 15 wherein the collaborative filter represents customer interactions with vehicles in a matrix, where rows of the matrix represent customers/users, columns in the matrix represent vehicles, and the matrix cells contain customer ratings or interactions.

17. The system of claim 15 wherein the content-based filter represents vehicles and users as feature vectors, where each feature corresponds to a characteristic of the vehicles or the users.

18. The system of claim 17 wherein the content-based filter includes calculating a similarity between a first vehicle and a second vehicle based on their feature vectors.

19. The system of claim 14 wherein the programming is also set up to make a customer-item prediction based on the similarity between preferences of the first user and predetermined features of an item, and wherein the customized recommendation is made based at least in part on the customer-item prediction and wherein the items relate to one or more of a vehicle navigation program, audio/video options, social media programs, interactions with devices paired with the vehicles, text messaging, phone use, shopping, restaurants, and feedback regarding one or more of the items.

20. The system of claim 14 wherein the predicted future use is based at least in part on historical data from the first user, historical data from other users, and current data from the first user.

* * * * *